United States Patent
Kim et al.

(10) Patent No.: US 8,334,907 B2
(45) Date of Patent: Dec. 18, 2012

(54) PHOTOGRAPHING METHOD AND APPARATUS USING FACE POSE ESTIMATION OF FACE

(75) Inventors: Hoe-won Kim, Suwon-si (KR); Jong-sun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 368 days.

(21) Appl. No.: 12/633,942

(22) Filed: Dec. 9, 2009

(65) Prior Publication Data
US 2010/0149343 A1    Jun. 17, 2010

(30) Foreign Application Priority Data
Dec. 16, 2008  (KR) .................. 10-2008-0128191

(51) Int. Cl.
*H04N 5/225*  (2006.01)
(52) U.S. Cl. .................. 348/169; 348/222.1; 382/118
(58) Field of Classification Search .................. 348/169, 348/222.1; 382/181, 118
See application file for complete search history.

(56) References Cited

U.S. PATENT DOCUMENTS

| | | | | |
|---|---|---|---|---|
| 7,508,979 B2 * | 3/2009 | Comaniciu et al. | ........... | 382/118 |
| 7,848,548 B1 * | 12/2010 | Moon et al. | ................... | 382/118 |
| 2003/0123754 A1 * | 7/2003 | Toyama | ....................... | 382/291 |
| 2003/0169907 A1 * | 9/2003 | Edwards et al. | .............. | 382/118 |
| 2005/0147291 A1 * | 7/2005 | Huang et al. | ................. | 382/159 |
| 2007/0041644 A1 * | 2/2007 | Kim et al. | ..................... | 382/190 |
| 2008/0298637 A1 * | 12/2008 | Hu et al. | ...................... | 382/103 |
| 2009/0060290 A1 * | 3/2009 | Sabe et al. | .................... | 382/118 |

* cited by examiner

*Primary Examiner* — Philip B Tran
(74) *Attorney, Agent, or Firm* — Drinker Biddle & Reath LLP (57) ABSTRACT

Provided are a photographing method and apparatus using face pose estimation. The photographing method includes: detecting a face area from an input image; estimating pose information in the detected face area; and determining a face direction based on the estimated pose information and recording the input image according to the face direction. Accordingly, when a face of a subject looks at something other than a camera, a picture is not taken, and thus a failed photograph is prevented.

18 Claims, 6 Drawing Sheets

PHOTOGRAPHING METHOD AND APPARATUS USING FACE POSE ESTIMATION OF FACE

CROSS-REFERENCE TO RELATED PATENT APPLICATION

This application claims the benefit of Korean Patent Application No. 10-2008-0128191, filed on Dec. 16, 2008, in the Korean Intellectual Property Office, the disclosure of which is incorporated herein in its entirety by reference.

BACKGROUND

The present invention relates to a photographing method and apparatus, and more particularly, to a photographing method and apparatus using face pose estimation.

An automatic photographing function using a face recognition function reduces a failure rate of photographing by not only detecting a face but also by performing a suitable operation on a certain facial expression recognized in a facial expression of the detected face. For example, a picture is not taken when a person blinks or a picture is automatically taken when a person smiles.

Japanese Patent No. 2005-56367 discloses a technology of suitably taking a picture of a face desired by a user by detecting a facial expression. In other words, an image including a face is input, a plurality of local features are detected from the input image, and then a face area is detected from the detected plurality of local features. Accordingly, a facial expression is determined by comparing each local feature in the detected face area and each local feature in a pre-determined face area.

According to a conventional technology, a picture may be automatically taken according to a certain facial expression, for example, waiting to take a picture when a person closes their eyes or automatically taking a picture when a person smiles, but it is not possible to automatically take a picture according to a direction of a face. For example, it is not possible to prevent photographing when a face of a subject is not looking at a camera.

SUMMARY

Various embodiments of the present invention provide a photographing method and apparatus using face pose estimation, which take a picture according to a face direction desired by a user by detecting a face of a subject and determining a direction of the face by estimating pose information of the detected face.

According to an aspect of the present invention, there is provided a photographing method using face pose estimation, the photographing method including: detecting a face area from an input image; estimating pose information in the detected face area; and determining a face direction based on the estimated pose information and recording the input image according to the face direction.

In the estimating, the pose information may be estimated by using three-dimensional (3D) head tracking.

In the determining and recording, recording the input image when the determined face direction corresponds to a predetermined face direction.

In the determining and recording, discordance information may be displayed to a user when the determined face direction does not correspond to a predetermined face direction.

In the estimating, pose information may be estimated from each of two face areas.

In the determining and recording, the face direction may be determined based on each piece of the pose information and the input image may be recorded when each face direction faces each other.

In the estimating, pose information may be estimated from each of at least three face areas.

In the determining and recording, the face directions may be determined based on each piece of pose information and discordance information may be displayed to a user about a face direction from among the determined face directions that does not correspond to a predetermined face direction.

According to another aspect of the present invention, there is provided a photographing apparatus using face pose estimation, the photographing apparatus including: a face area detector which detects a face area from an input image; a pose estimator which estimates pose information from the detected face area; and a controller which determines a face direction based on the estimated pose information and recording the input image based on whether the face direction is a certain direction.

The pose estimator may estimate poser information by using three-dimensional (3D) head tracking.

The controller may record the input image when the determined face direction corresponds to a predetermined face direction.

The controller may display discordance information to a user when the determined face direction does not correspond to a predetermined face direction.

The pose estimator may estimate pose information from each of two face areas.

The controller may determine face directions based on each piece of pose information and record the input image when each of the face directions faces each other.

The pose estimator may estimate pose information from each of at least three face areas.

The controller may determine face directions based on each piece of pose information and display discordance information to a user about a face direction from among the determined face directions that does not correspond to a predetermined face direction.

According to another aspect of the present invention, there is provided a computer readable recording medium having recorded thereon a program for executing the method of above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described more fully with reference to the accompanying drawings, in which exemplary embodiments of the invention are shown. Also, while describing the present invention, detailed descriptions about related well-known functions or configurations that may diminish the clarity of the points of the present invention are omitted.

Unless defined otherwise, technical and scientific terms used herein have the same meaning as is commonly understood by one of skill in the art to which this invention belongs.

Figure 1:
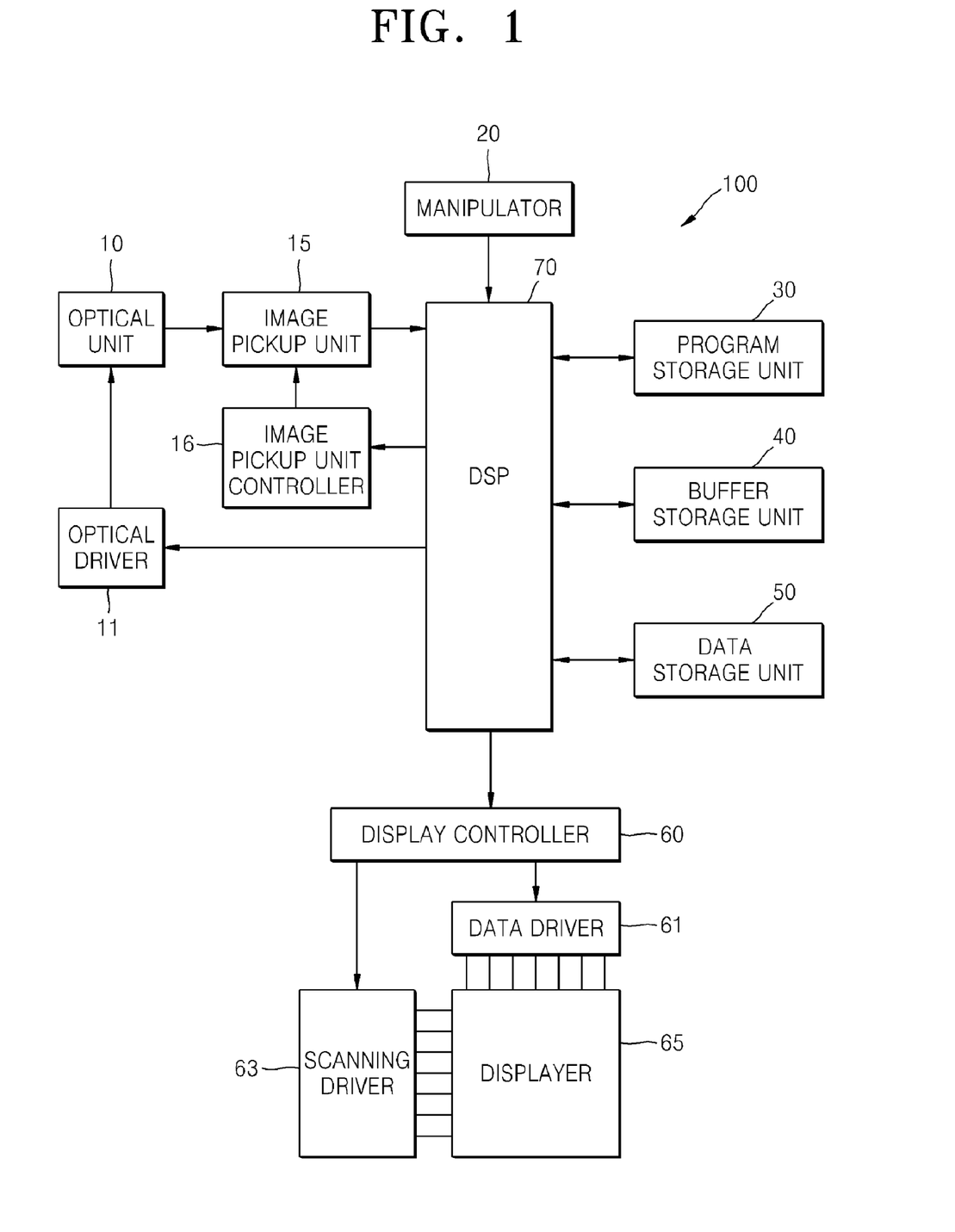
FIG. 1 is a block diagram schematically illustrating a digital photographing apparatus according to an embodiment of the present invention.
Figure 2:
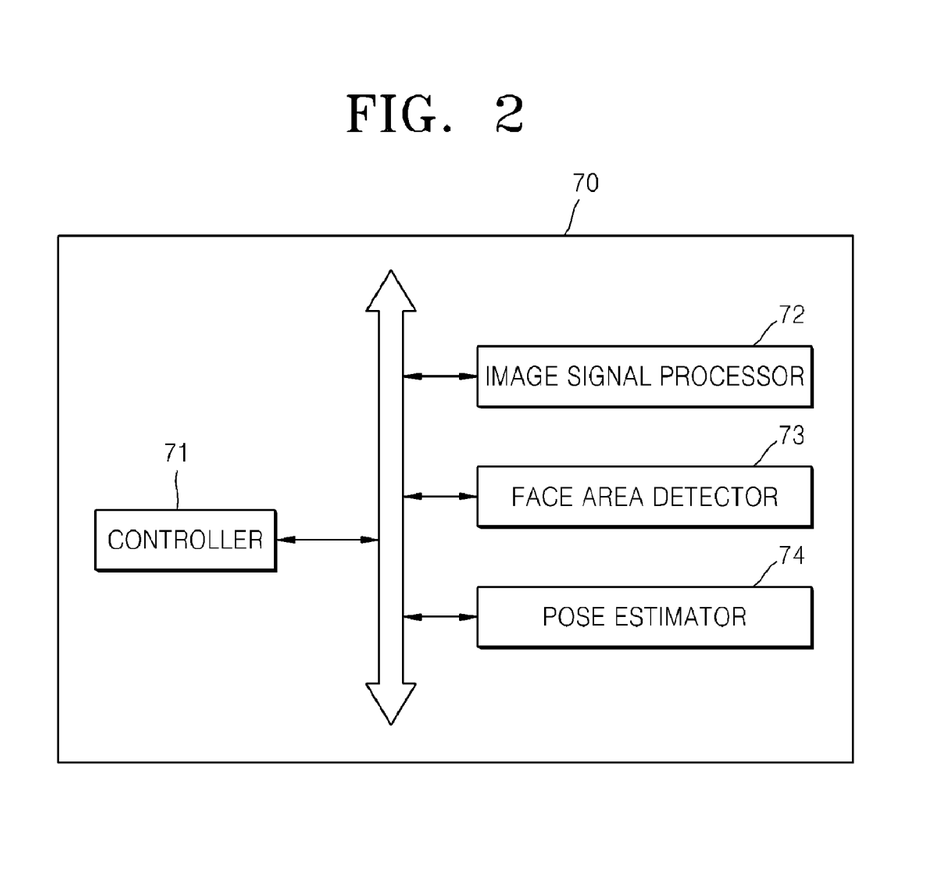
FIG. 2 is a block diagram schematically illustrating a digital signal processor of FIG. 1.

FIG. 1 is a block diagram schematically illustrating a digital photographing apparatus 100 according to an embodiment of the present invention, and FIG. 2 is a block diagram schematically illustrating a digital signal processor (DSP) 70 of FIG. 1.

Referring to FIG. 1, the digital photographing apparatus 100 includes an optical unit 10, an optical driver 11, an image pickup unit 15, an image pickup unit controller 16, a manipulator 20, a program storage unit 30, a buffer storage unit 40, a data storage unit 50, a display controller 60, a data driver 61, a scanning driver 63, a displayer 65, and the DSP 70.

The optical unit 10 receives an optical signal from a subject, and transmits the received optical signal to the image pickup unit 15. The optical unit 10 may include at least one lens such as a zoom lens, which narrows or widens a view angle according to a focal length, and a focus lens, which adjusts a focus of the subject. The optical unit 10 may further include an iris which adjusts light intensity.

The optical driver 11 adjusts a location of the lens and closes or opens the iris. The focus may be adjusted by moving a location of a lens. Also, the light intensity may be adjusted by opening or closing an iris. The optical driver 11 may control the optical unit 10 according to a control signal, which is automatically generated by an image signal received in real time or is manually input by manipulation of a user.

An optical signal that passed through the optical unit 10 forms an image of the subject on a light receiving surface of the image pickup unit 15. The image pickup unit 15 may use a charge coupled device (CCD) or a complementary metal oxide semiconductor image sensor (CIS), which convert an optical signal to an electric signal. Sensitivity or the like of the image pickup unit 15 may be adjusted by the image pickup unit controller 16. The image pickup unit controller 16 may control the image pickup unit 15 according to a control signal, which is automatically generated according to an image signal received in real time or is manually input by manipulation of the user.

The manipulator 20 may be used to receive a control signal from the outside, such as the user. The manipulator 20 includes a shutter-release button, which receives a shutter-release signal for capturing an image by exposing the image pickup unit to light for a predetermined time, a power supply button, which is pressed to supply power to the digital photographing apparatus 100, a wide angle-zoom button and a telescopic-zoom button, which widens or narrows a view angle according to an input, and various function buttons for selecting a mode, such as a character input mode, a photo-graphing mode, or a reproducing mode, for selecting a white balance setting function, and for selecting an exposure setting function. According to an embodiment, a photographing mode using face pose estimation may be selected by using the manipulator 20, and a picture may be taken only when a face looks at a certain direction, such as at a camera. Also, when the number of faces to be photographed is two, for example, when an image where a couple is looking at each other is to be captured, the image may be captured when face directions face each other.

As described above, the manipulator 20 may have a form including various buttons, but is not limited thereto. The manipulator 20 may have a form that receives an input of the user, such as a keyboard, a touch pad, a touch screen, or a remote controller.

The digital photographing apparatus 100 includes the program storage unit 30, which stores programs such as an operating system and an application system for operating the digital photographing apparatus 100, the buffer storage unit 40, which temporarily stores data required to operate the digital photographing apparatus 100 or result data, and the data storage unit 50, which stores various pieces of information required for a program and an image file including an image signal.

Moreover, the digital photographing apparatus 100 includes the display controller 60, which displays an operating status or information about an image captured by the digital photographing apparatus 100, the data driver 61 and the scanning driver 63, which transmit display data received from the display controller 60 to the displayer 65, and the displayer 65, which displays a predetermined image according to a signal received from the data driver 61 and the scanning driver 63. According to an embodiment, when a face to be photographed is not looking in a predetermined direction, the displayer 65 may display such discordance information, for example, it may display a certain icon on a corresponding face on a screen or display a photographing prohibition, according to a control signal of the DSP 70.

The displayer 65 may be a liquid crystal display panel (LCD), an organic light emitting display panel (OLED), or an electrophoresis display panel (EPD).

Also, the digital photographing apparatus 100 includes the DSP 70, which processes a received image signal and controls each element according to the image signal or an external input signal.

The DSP 70 will now be described with reference to FIG. 2.

Referring to FIG. 2, the DSP 70 includes a controller 71, an image signal processor 72, a face area detector 73, and a pose estimator 74.

The controller 71 controls overall operations of the DSP 70.

The image signal processor 72 converts an image signal received from the image pickup unit 15 to a digital signal, and processes the image signal, such as gamma correction, color filter array interpolation, color matrix, color correction, color enhancement, or the like, so that the image signal is suitable for the viewpoint of a person. When the image signal processor 72 is to process the image signal, an auto white balance or auto exposure algorithm may be performed. Also, a size of image data is adjusted by using a scaler, and an image file having a predetermined form by compressing the image data is formed. Alternatively, an image file may be decompressed. The image signal processor 72 may process image signals that are received via an image signal and a shutter release signal received in real time in a live-view mode before taking a photograph. Here, the image signals may be differently processed.

The face area detector 73 detects a face area from an image processed through the image signal processor 72. In other words, the face area detector 73 detects where a face is in an input image. The face area detector 73 determines whether the input image includes feature data of a face by comparing pre-stored feature data of a face and data of the input image, and when the input image includes the feature data, recognizes a location of the face in the input image. Many conventional technologies exist for detecting a face area, and a face area may be detected via Adaboosting algorithm or skin color information.

Figure 3:
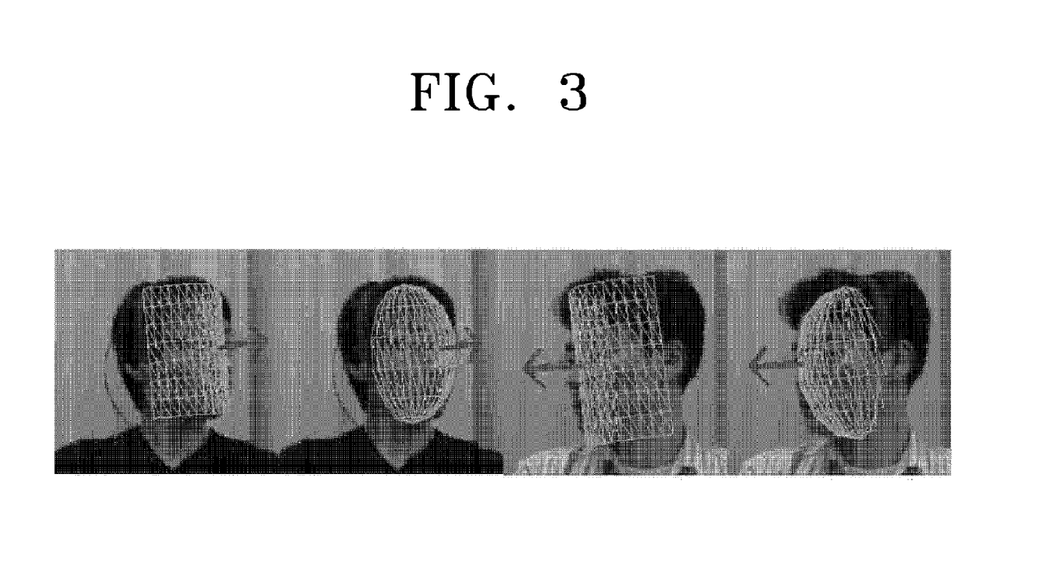
FIG. 3 is a photographic image for describing face pose estimation according to an embodiment of the present invention.

The pose estimator 74 estimates face pose information based on the face area detected by the face area detector 73. Here, the face pose information includes information about a direction that a face is looking in, i.e., view information. According to an embodiment of the present invention, the pose estimator 74 determines a face direction by estimating a pose of the head. Here, three-dimensional (3D) head tracking is used to estimate the pose of the head. The pose estimator 74 calculates a head motion parameter by using 3D head tracking, and estimates a face direction with the head motion parameter. FIG. 3 is a photographic image for describing face pose estimation via 3D head tracking.

The 3D head tracking is strong in tracking pose change by using a 3D cylinder head model, which very capably expresses a face shape of a person, and very capably estimates a face even in quick motion by using a dynamic template method, which uses a previous input image patch as a current template. Detailed description about the 3D head tracking is disclosed in "Real-time 3D Head Tracking and Head Gesture Recognition, Proceeding of the 16th IEEE International Symposium on Robot and Human Interactive Communication (RO-MAN 2007), pp. 166-172, 2007" of Woo-Ju Ryu et al., herein incorporated by reference.

According to an embodiment, the 3D head tracking is used to estimate a face direction, but other algorithms for calculating object pose information may be used. For example, a pose of an object may be searched for in a single image by using a pose from the orthography and scaling with iteration (POSIT) that is suitable for calculating object pose information in real time.

The controller 71 receives the estimated face pose information from the pose estimator 74, determines a face direction by using the face pose information, and records the input image based on whether the face direction is a certain direction. In other words, the input image is recorded only when the face direction corresponds to a predetermined direction. Also, when the face direction does not correspond to the predetermined direction, the controller 71 displays discordance information to a user.

When the number of face areas in the input image is two, the controller 71 determines face directions of each face area by using face pose information estimated by the pose estimator 74, and records the input image when the face directions face each other.

According to an embodiment, photographing is prohibited when the face directions are looking at something other than a camera, or when the face directions are not facing each other in a case a user wants to capture an image where two people look at each other.

Accordingly, a photographing failure is prevented by prohibiting photographing when a face of a subject looks at something other than a camera. Also, when people are photographed, a photographing failure rate is effectively reduced by preventing a picture from being taken when some subjects are not looking at a camera or prohibiting photographing by detecting a subject not facing the camera. Alternatively, when a picture is to be taken when a subject is not looking at a camera, photographing is prohibited when the subject is looking at the camera. Accordingly, a photographer may take a picture with a desired pose.

Figure 4:
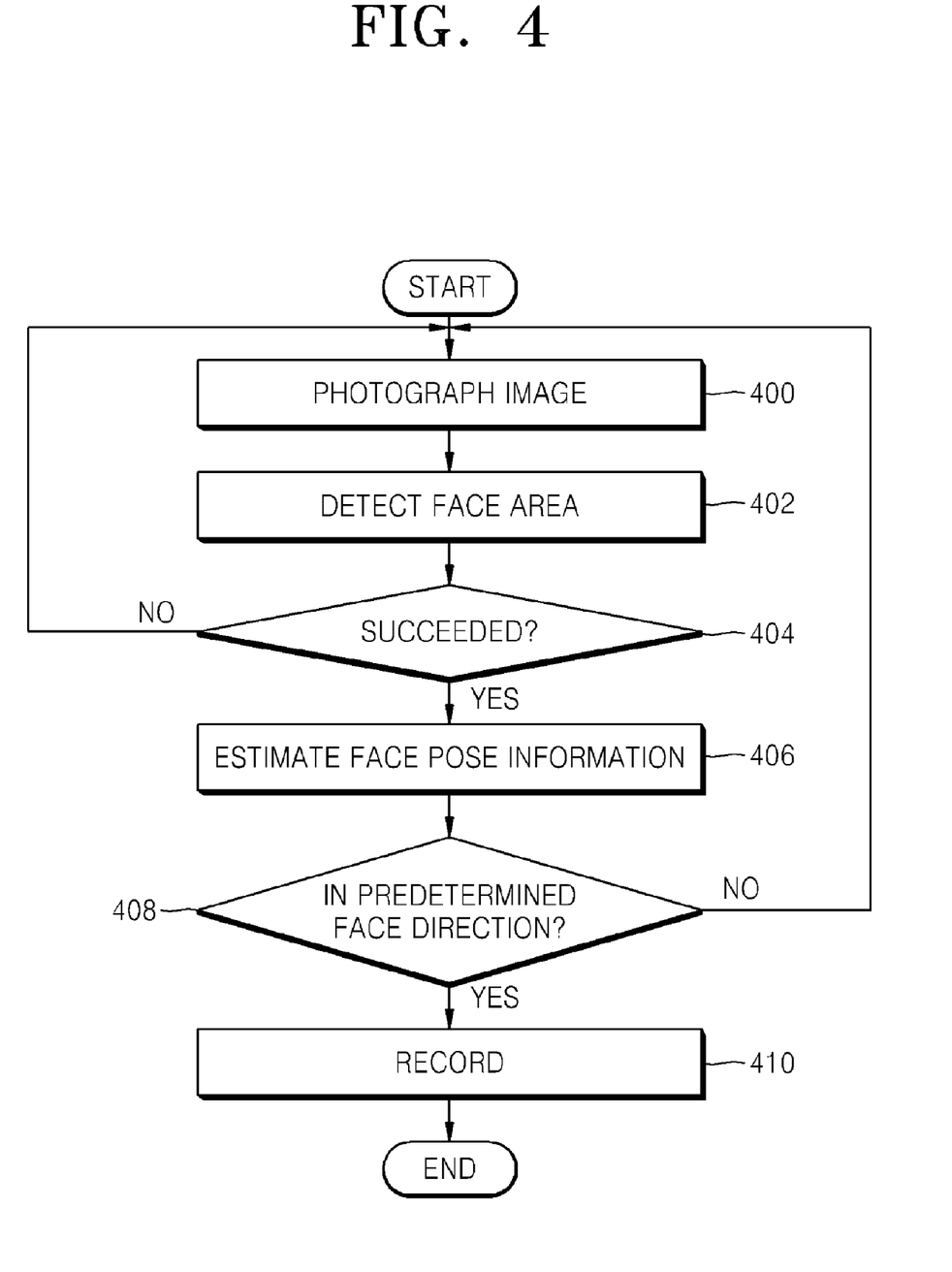
FIG. 4 is a flowchart illustrating a photographing method using face pose estimation, according to an embodiment of the present invention.

FIG. 4 is a flowchart illustrating a photographing method using face pose estimation, according to an embodiment of the present invention.

Referring to FIG. 4, an image is captured in operation 400. Here, the image denotes a preview input image. In operation 402, a face area is detected in the preview input image. When it is determined that the face area is detected in the preview input image in operation 404, face pose information is estimated in the detected face area in operation 406. It is determined whether a face direction is in a predetermined face direction based on the face pose information in operation 408. The preview input image is recorded in operation 410 when it is determined that the face direction is in the predetermined face direction in operation 408.

Figure 5A:
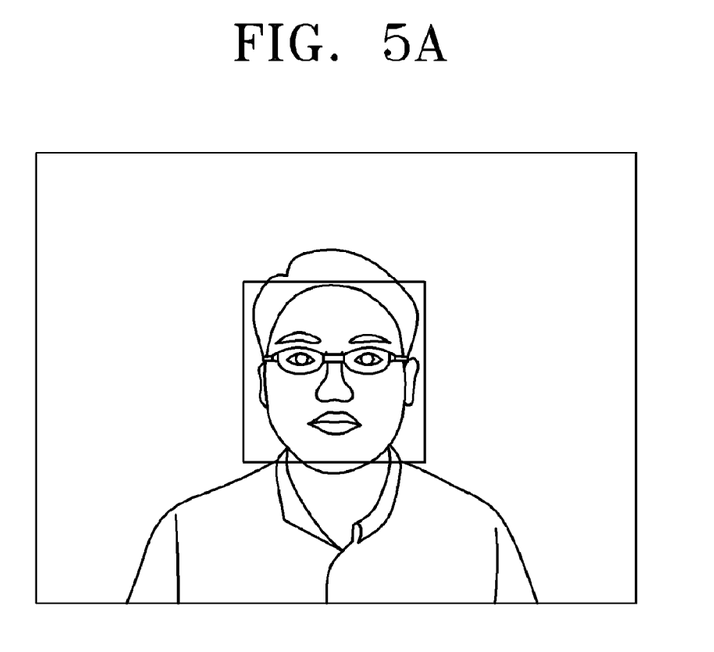
FIGS. 5A and 5B are pictorial diagrams for describing a photographing method using face pose estimation, according to another embodiment of the present invention.
Figure 5B:
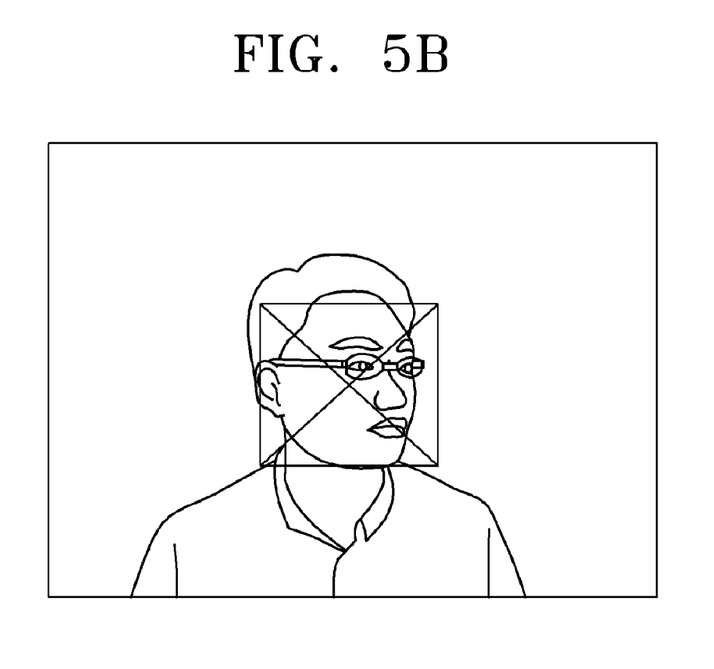

FIGS. 5A and 5B are diagrams for describing a photographing method using face pose estimation, according to another embodiment of the present invention.

In FIG. 5A, a face is looking to the front, i.e., looking at a camera, and in FIG. 5B, a face is looking to a side, i.e., not looking at a camera and thus photographing is prohibited. Accordingly, a user may take a picture of a desired face by recording the face when the face is looking in a direction that the user wants, and prohibiting photographing otherwise.

Figure 6:
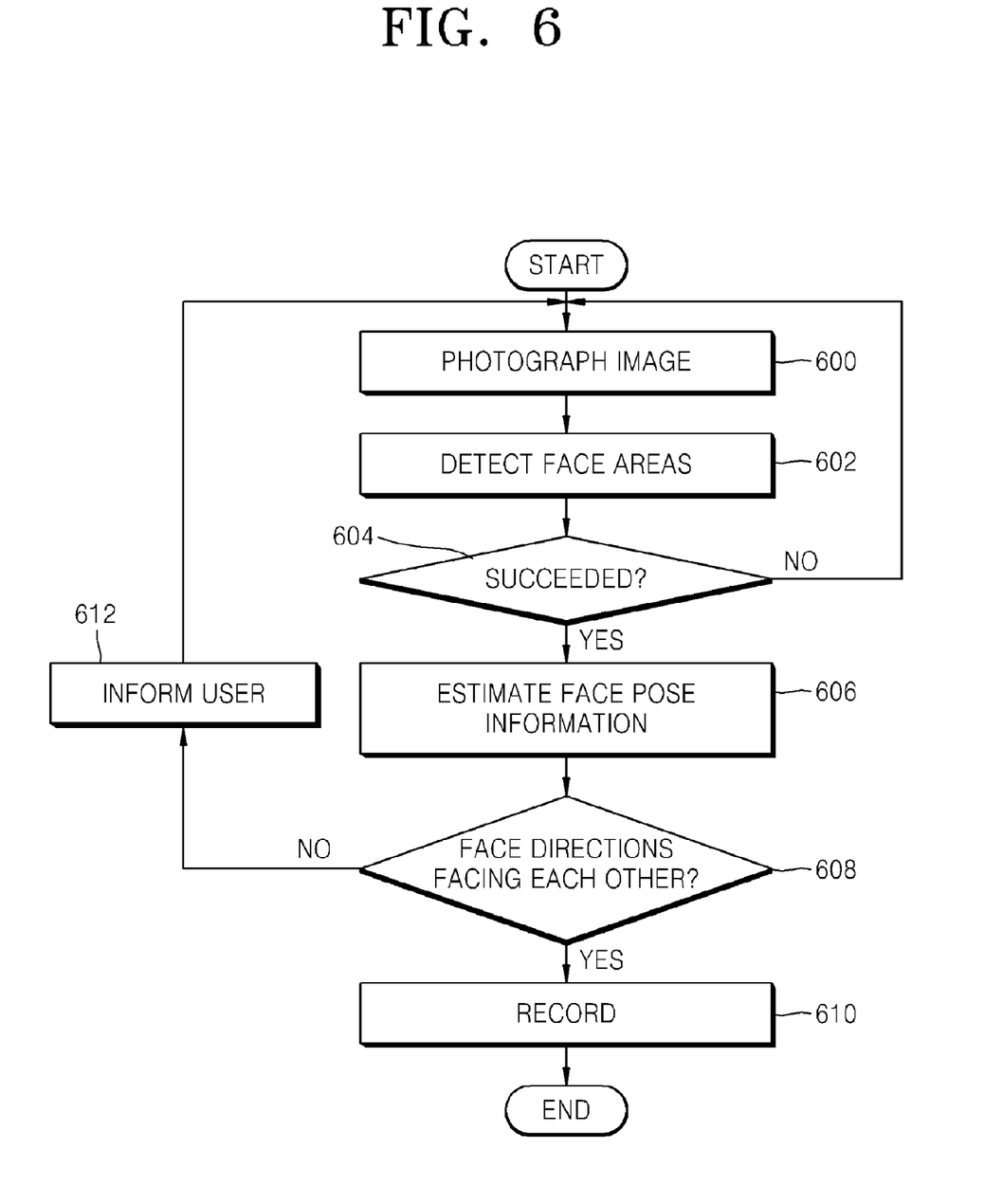
FIG. 6 is a flowchart illustrating a photographing method using face pose estimation, according to another embodiment of the present invention.

FIG. 6 is a flowchart illustrating a photographing method using face pose estimation, according to another embodiment of the present invention.

Referring to FIG. 6, an image is captured in operation 600. Here, the image denotes a preview input image. In operation 602, face areas are detected in the preview input image. Here, the number of the detected face areas is at least two. When it is determined that the face areas are detected in the preview input image in operation 604, face pose information is estimated in each of the detected face areas in operation 606. When two face areas are detected, face directions are determined from each piece of pose information, and it is determined whether the face directions are facing each other in operation 608. When it is determined that the face directions are facing each other in operation 608, the preview input image is recorded in operation 610. Otherwise, when it is determined that the face directions are not facing each other in operation 608, such discordance information is informed to a user in operation 612.

Figure 7A:
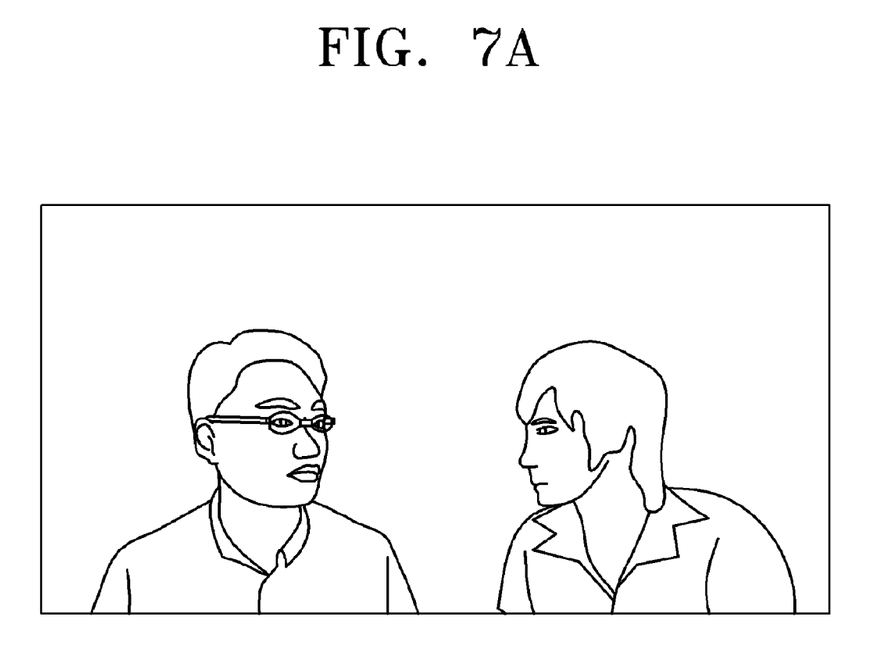
FIGS. 7A and 7B are pictorial diagrams for describing a photographing method using face pose estimation, according to another embodiment of the present invention.
Figure 7B:
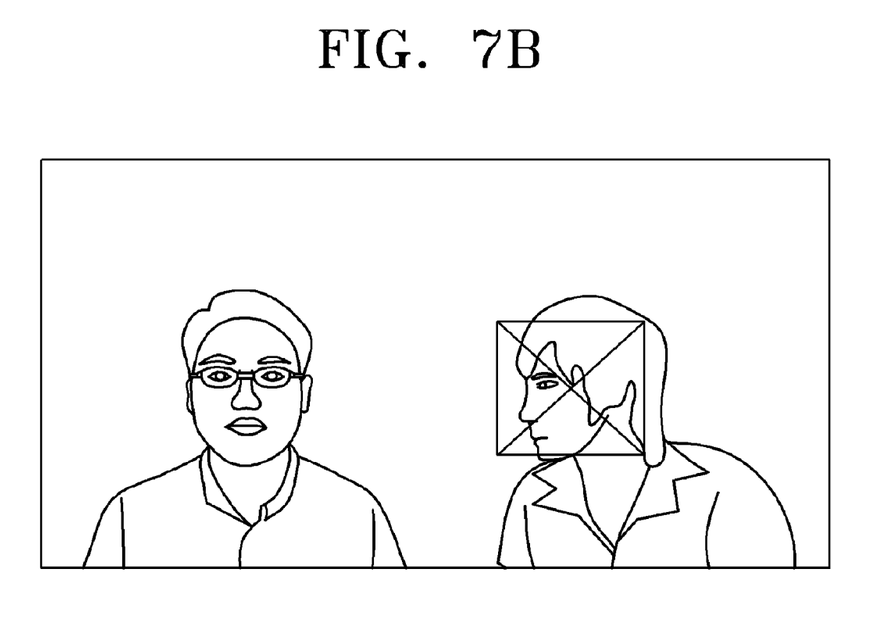

FIGS. 7A and 7B are diagrams for describing a photographing method using face pose estimation, according to another embodiment of the present invention.

FIG. 7A illustrates a case wherein a picture is taken when two people are looking at each other. FIG. 7B illustrates a case wherein a camera is set to take a picture when two people look to the front, i.e., look at the camera, and a user is informed to not to take the picture since one person is not looking to the front.

The photographing method according to the present invention includes detecting a face area from an input image, estimating pose information in the detected face area, and determining a face direction based on the estimated pose information and recording the input image according to the face direction. Accordingly, when a face of a subject looks at something other than a camera, a picture is not taken, and thus a failing photograph is prevented.

Also, when people are photographed, a photographing failure rate is effectively reduced by preventing a picture from being taken when some subjects are not looking at a camera or prohibiting photographing by detecting a subject not facing the camera. Alternatively, when a picture is to be taken when a subject is not looking at a camera, photographing is prohibited when the subject is looking at the camera. Accordingly, a photographer may take a picture with a pose desired by the photographer.

In the embodiments described above, a digital camera is mainly discussed as an example of a photographing apparatus for applying the present invention, but the digital photographing apparatus is not limited thereto. It will be easily understood by one of ordinary skill in the art that the present invention may be applied to a camera phone, personal digital assistant (PDA), or a portable multimedia player (PMP) having a camera function.

The invention can also be embodied as computer readable codes arranged in software modules on a computer readable recording medium. The computer readable recording medium is any data storage device that can store data which can be thereafter read by a computer system, stored in memory, and executed by a processor.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A photographing method using face pose estimation, the photographing method comprising:
   detecting a face area from an input image;
   estimating pose information in the detected face area;
   determining a face direction based on the estimated pose information; and
   subsequently recording the input image based on the determined face direction.

2. The photographing method of claim 1, wherein in the estimating, the pose information is estimated by using three-dimensional (3D) head tracking.

3. The photographing method of claim 2, wherein in the determining and recording, the method further comprises recording the input image only when the determined face direction corresponds to a predetermined face direction.

4. The photographing method of claim 2, wherein in the determining and recording, the method further comprises displaying discordance information to a user when the determined face direction does not correspond to a predetermined face direction.

5. The photographing method of claim 2, wherein in the estimating, the method further comprises estimating pose information from each of two face areas.

6. The photographing method of claim 5, wherein in the determining and recording, the method further comprises determining the face direction based on each piece of the pose information and the input image is recorded when each face direction faces each other.

7. The photographing method of claim 2, wherein in the estimating, the method further comprises estimating pose information from each of at least three face areas.

8. The photographing method of claim 7, wherein in the determining and recording, the method further comprises:
determining the face directions based on each piece of pose information; and
displaying discordance information to a user about a face direction from among the determined face directions that does not correspond to a predetermined face direction.

9. A non-transitory computer readable recording medium having recorded thereon a program for executing the method of claim 1.

10. A photographing apparatus using face pose estimation, the photographing apparatus comprising:
a face area detector which detects a face area from an input image;
a pose estimator which estimates pose information from the detected face area; and
a controller which determines a face direction based on the estimated pose information and records the input image based on whether the face direction is a certain direction.

11. The photographing apparatus of claim 10, wherein the pose estimator estimates poser information by using three-dimensional (3D) head tracking.

12. The photographing apparatus of claim 11, wherein the controller records the input image when the determined face direction corresponds to a predetermined face direction.

13. The photographing apparatus of claim 11, wherein the controller displays discordance information to a user when the determined face direction does not correspond to a predetermined face direction.

14. The photographing apparatus of claim 11, wherein the pose estimator estimates pose information from each of two face areas.

15. The photographing apparatus of claim 14, wherein the controller determines face directions based on each piece of pose information and records the input image when each of the face directions faces each other.

16. The photographing apparatus of claim 11, wherein the pose estimator estimates pose information from each of at least three face areas.

17. The photographing apparatus of claim 16, wherein the controller determines face directions based on each piece of pose information and displays discordance information to a user about a face direction from among the determined face directions that does not correspond to a predetermined face direction.

18. A photographing method using face pose estimation, the photographing method comprising:
detecting a face area from an input image;
estimating pose information in the detected face area;
determining a face direction based on the estimated pose information; and
prohibiting recording of the input image based on the determined face direction.

* * * * *